Jan. 25, 1966    R. L. DIETERT    3,230,635
DRYER AND HEATER FOR GRANULAR MATERIAL
Original Filed July 9, 1962
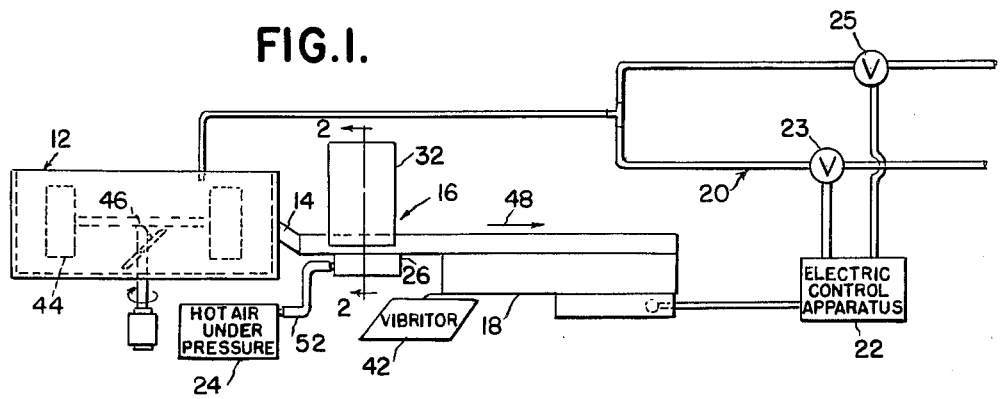
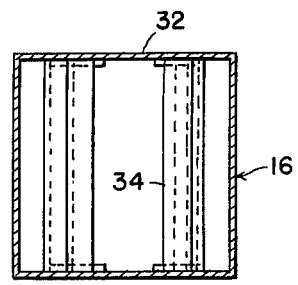
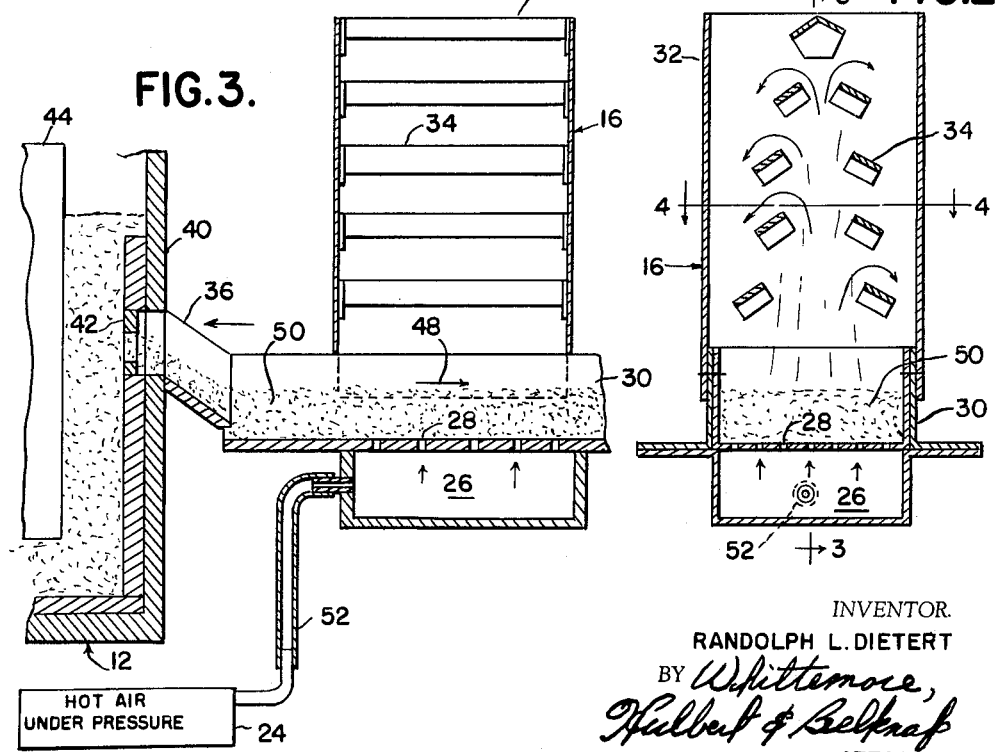
INVENTOR.
RANDOLPH L. DIETERT
ATTORNEYS United States Patent Office 3,230,635
Patented Jan. 25, 1966

3,230,635
DRYER AND HEATER FOR GRANULAR MATERIAL
Randolph L. Dietert, Detroit, Mich., assignor to Harry W. Dietert Co., Detroit, Mich., a corporation of Michigan
Original application July 9, 1962, Ser. No. 208,442. Divided and this application Sept. 23, 1963, Ser. No. 310,838
5 Claims. (Cl. 34—57)

This is a division of application Serial No. 208,442, filed July 9, 1962.

The invention relates to granular material conditioning apparatus and refers more specifically to structure for treating granular material between a conditioning mill therefor and the location of utilization of the conditioned granular material to compensate for different distances between the conditioning mill and the location of utilization of the conditioned granular material.

In present-day foundries, granular material for use in constructing molds and the like is often conditioned a considerable distance from the location at which the granular material is utilized. Further, the distance between the location at which the granular material is conditioned and the location at which the conditioned granular material is utilized is not always the same. That is to say at different times conditioned granular material may be moved on a conveyor different distances before it is utilized.

In some installations granular material from a single granular material conditioning mill is carried by means of conveyors or the like to a plurality of locations at different distances from the conditioning mill.

Also, in the conditioning of granular material, it has been found desirable to control the conditioning by determining a physical property such as moldability of a continuous sample of granular material withdrawn from the conditioning mill. The structure for determining the moldability of the sample of granular material is usually positioned close to the granular material conditioning mill, while the location at which the conditioned granular material is to be utilized will normally be considerably further removed from the conditioning mill. The moldability or other physical property determined close to the granular material conditioning mill will not provide a true indication of the physical property at the utilizing location, since on traveling a longer distance the conditioned granular material is subject to air currents and internal movement which tend to change the temperature of and dry out the granular material, thereby changing the physical property.

It is therefore an object of the present invention to provide structure for compensating for the effect on the physical properties of conditioned granular material of transporting the conditioned granular material different distances.

Another object is to provide structure for compensating conditioned granular material for the distance of travel thereof to provide granular material of uniform physical properties comprising a trough, means for passing the granular material along the trough, openings extending through the trough, and means for blowing heated air through the granular material as it passes along the trough.

Another object is to provide compensating structure for conditioned granular material as set forth above and further including a chimney positioned over the trough opposite the openings in the trough into which the granular material is blown by the heated air.

Another object is to provide compensating structure for conditioned granular material as set forth above wherein the chimney includes baffles extending thereacross and longitudinally of the trough for defining granular material flow in the chimney.

Another object is to provide structure for compensating granular material for different distances between the location at which the granular material is conditioned and the location of utilization thereof which is simple, economical and efficient.

Other objects and features of the invention will become apparent as the description proceeds, especially when taken in conjunction with the accompanying drawings illustrating a preferred embodiment of the invention, wherein:

FIGURE 1 is an elevation view of granular material conditioning apparatus including structure for compensating conditioned granular material for the difference in distance between a granular material conditioning mill and means for separating the conditioned granular material in accordance with the moldability thereof relative to the distance between the granular material conditioning mill and a location of utilization of conditioned granular material constructed in accordance with the invention.

FIGURE 2 is an enlarged section view of the compensating structure illustrated in FIGURE 1 taken substantially on the line 2—2 of FIGURE 1.

FIGURE 3 is a section view of a portion of the granular material conditioning apparatus illustrated in FIGURE 1 and the compensating structure illustrated in FIGURE 2 and taken substantially on the line 3—3 in FIGURE 2.

FIGURE 4 is a transverse cross section of the chimney portion of the compensating structure illustrated in FIGURE 2 and taken substantially on the line 4—4 in FIGURE 2.

With particular reference to the figures of the drawings, a specific embodiment of the present invention will now be considered in detail.

As shown in FIGURE 1, the granular material conditioning apparatus 10 includes the mill 12, a sample feeding structure 14, compensating structure 16 separating structure 18, metering means 20 for metering additives to granular material in mill 12 and electric control apparatus 22 responsive to the separating structure 18 for controlling the metering means 20 to meter additives to the mill 12 to provide granular material having a predetermined moldability.

In operation, an additive such as water is passed from the metering means 20 into the mill 12 where it is mixed with granular material. A continuous sample of granular material is fed through sample feeding structure 14 past the compensating structure 16 which functions to produce the same effect on the physical properties of the sample of granular material as a predetermined distance of travel of the granular material on a separate conveyor to a utilizing device would normally have. The granular material is then separated in accordance with the moldability thereof in separating structure 18. The moldability of the granular material is sensed by the control apparatus 22 which in turn actuates the valves 23 and 25 of metering means 20 to cut off the addition of water to the mill 12 when a predetermined moldability of the sample of granular material is sensed.

The details of the mill 12, sample feeding structure 14, separating structure 18, control apparatus 22, and metering means 20 are considered in the above referenced patent application, of which the present application is a division. This structure will not therefore be considered in detail herein.

The compensating structure 16 which is the subject matter of the present invention is positioned between the sample feeding structure and the separating structure 18 and includes a source of hot air under pressure 24, a chamber 26 into which the heated air under pressure is passed, openings 28 in the bottom of the extended trough portion 30 of the separating structure 18 through which trough the granular material fed from the mill 12 is passed, and the chimney 32 secured to the trough 30 by convenient means such as welding (not shown) having a plurality of baffles 34 therein.

The compensating apparatus 16 functions to blow granular material passed down the trough 30 into the chimney 32 where the granular material is tumbled so that the physical properties of the sample of granular material are changed in the same manner that the physical properties of the sample of granular material would be changed on traveling a greater distance between the granular material conditioning mill 12 and a remote location at which the granular material is utilized or between the mill 12 and a more remotely located separating structure 18.

As shown best in FIGURE 2, a substantially continuous sample of granular material 50 is fed from chute 36 into trough 30 from the container 40 of mill 12 through sample feeding structure 14 on rotation of the mulling rollers 44 and scrapers 46 of the mill 12. The trough 30 is an extension of the separating structure 18 which is caused to vibrate by the vibrating means 42 to advance granular material along the trough 30 in the direction of arrow 48.

The sample of granular material 50 as it is passed over the openings 28 in trough 30 is subjected to jets of heated air under pressure from chamber 26. The air under pressure in chamber 26 is provided from a source of hot air under pressure through the flexible hose 52 which is connected between the source of hot air under pressure and the chamber 26 to permit vibration of the trough 30.

The jets of hot air under pressure blow the granular material passing through trough 30 in the direction of arrow 48 into the chimney 32 of the compensating structure 16 where it is tumbled so that it is dried and heated. The moisture content and temperature of the granular material is thus changed in substantially the same manner that these physical properties are effected on greater travel thereof through a trough such as the trough 30 or the usual conveyer to a remote location. These physical properties of the granular material can be controlled as the granular material passes through the compensating structure 16 by varying the pressure and temperature of the air supplied ot the chamber 26.

The baffles 34 provided in the chimney 32 serve to permit the granular material to rise in the center of the chimney and to be returned downwardly along the walls of the chimney in an advantageous flow. The granular material in the chimney will of course be saturated in a very short time after initiation of air pressure to the granular material passing down trough 30 and portions thereof will be continuously returned to the trough 30 while other granular material will be blown into the chimney 32.

It will be particularly noted that the baffles 34 in the chimney 32 are positioned longitudinally of the trough 30 and make an angle of approximately 30° with respect to the horizontal. The baffles 34 are further positioned closer to the longitudinal center line of the trough 30 and chimney 32 as the vertical height of the baffles increase. This construction adds greatly to the desired flow of granular material through the chimney 32.

While one modification of the compensating structure of the invention has been considered in detail, it will be understood that other embodiments and modifications thereof are contemplated. It is the intention to include all modifications and embodiments of the invention as are defined by the appended claims within the scope of the invention.

What I claim as my invention is:

1. Granular material conditioning apparatus including a mill in which granular material is conditioned, separating structure including an elongated open top trough having openings through the bottom of a portion thereof for separating a sample of granular material fed thereto from the mill, sample feeding structure positioned between the mill and separating structure for feeding a sample of granular material to the separating structure, and compensating structure for the sample of granular material including a chimney positioned over the openings through the portion of the trough including baffles therein for controlling the flow of granular material blown into the chimney from the trough, means forming a chamber beneath the portion of the trough, and means for blowing a conditioned gas under pressure into the chamber and through the openings in said trough to blow the sample of granular material passed through the trough into the chimney whereby the granular material is compensated for a relatively short distance of travel through the separating structure.

2. In granular material conditioning apparatus including a mill in which granular material is conditioned, separating structure including an elongated open top trough having openings through the bottom of a portion thereof for separating a sample of granular material fed thereto from the mill, and sample feeding structure positioned between the mill and separating structure for feeding a sample of granular material to the separating structure, compensating structure for the sample of granular material including a chimney positioned over the openings through the portion of the trough including baffles therein for controlling the flow of granular material blown into the chimney from the trough, means forming a chamber beneath the portion of the trough, and means for blowing a conditioned gas under pressure into the chamber and through the openings in said trough to blow the sample of granular material passed through the trough into the chimney whereby the granular material is compensated for a relatively short distance of travel through the separating structure.

3. Structure as set forth in claim 1 wherein the baffles extend transversely of the chimney and longitudinally of the elongated open top trough.

4. Structure as set forth in claim 1 wherein the baffles are inclined with respect to the horizontal in a direction transversely of the elongated open top trough and downwardly outwardly of the elongated open top trough on opposite sides of the longitudinal center line of the elongated open top trough.

5. Structure as set forth in claim 3 wherein the baffles are positioned in pairs vertically of the chimney and each pair of baffles is symmetrical about the longitudinal center line of the elongated open top trough and are progressively closer together outwardly of the elongated open top trough.

References Cited by the Examiner

UNITED STATES PATENTS

| | | | |
|---|---|---|---|
| 1,960,616 | 5/1934 | Bartram | 34—10 |
| 2,017,586 | 10/1935 | Cottee | 34—10 |
| 3,031,769 | 5/1962 | Wilson | 34—57 |
| 3,166,383 | 1/1965 | Morris | 34—10 |

WILLIAM F. O'DEA, *Primary Examiner.*
JOHN J. CAMBY, *Examiner.*